United States Patent
Barry et al.

(10) Patent No.: US 10,889,446 B2
(45) Date of Patent: Jan. 12, 2021

(54) TUBULAR CABLE CONVEYOR SLUG WITH INTEGRATED CONNECTOR

(71) Applicant: Flexicon Corporation, Bethlehem, PA (US)

(72) Inventors: Daniel Joel Barry, Bethlehem, PA (US); John Stephen Szazdi, Jr., Northampton, PA (US)

(73) Assignee: FLEXICON CORPORATION, Bethlehem, PA (US)

( * ) Notice: Subject to any disclaimer, the term of this patent is extended or adjusted under 35 U.S.C. 154(b) by 0 days.

(21) Appl. No.: 16/460,579

(22) Filed: Jul. 2, 2019

(65) Prior Publication Data
US 2020/0062509 A1 Feb. 27, 2020

Related U.S. Application Data

(60) Provisional application No. 62/721,231, filed on Aug. 22, 2018.

(51) Int. Cl.
*B65G 19/24* (2006.01)
*B65G 19/14* (2006.01)

(52) U.S. Cl.
CPC ............. *B65G 19/14* (2013.01); *B65G 19/24* (2013.01)

(58) Field of Classification Search
USPC .......................... 197/716, 728, 729, 731, 733
See application file for complete search history.

(56) References Cited

U.S. PATENT DOCUMENTS

| 810,149 A | 1/1906 | Horst | |
|---|---|---|---|
| 2,124,485 A | 7/1938 | Dellenbach | |
| 2,465,287 A * | 3/1949 | Delos | B65G 19/16 198/733 |
| 2,586,538 A * | 2/1952 | Hapman | B65G 19/16 198/716 |
| 3,126,089 A * | 3/1964 | smith | B65G 19/20 198/733 |
| 3,216,553 A | 11/1965 | Leach | |
| 3,653,492 A * | 4/1972 | Temme | B65G 19/10 198/731 |
| 3,722,664 A * | 3/1973 | Hart | A01K 5/0208 198/716 |
| 3,762,535 A * | 10/1973 | Becker | B65G 17/385 198/716 |

(Continued)

FOREIGN PATENT DOCUMENTS

| GB | 1018608 A | 1/1966 |
|---|---|---|
| JP | 2002-165532 A | 6/2002 |

(Continued)

*Primary Examiner* — Joseph A Dillon, Jr.
(74) *Attorney, Agent, or Firm* — Volpe Koenig

(57) ABSTRACT

A drag conveyor assembly is disclosed that allows for improved functionality and connectivity to form an endless loop. The assembly includes a traction element and a plurality of slugs fixedly attached to the traction element. When any one of the slugs is split, each split slug section of the slug remains fixedly attached to the traction element. In one embodiment, each slug of the plurality of slugs includes a cutting groove. A ferrule pair is provided to attach each slug to the traction element. The cutting grooves facilitate a cutting or slicing process to split the slug into split slug sections.

6 Claims, 10 Drawing Sheets

(56) References Cited

U.S. PATENT DOCUMENTS

| | | | | |
|---|---|---|---|---|
| 3,777,876 | A * | 12/1973 | Schreier | B65G 19/28 |
| | | | | 198/729 |
| 3,889,799 | A * | 6/1975 | Pirovano | B65G 19/16 |
| | | | | 198/717 |
| 3,895,705 | A * | 7/1975 | Bockau | E21D 9/12 |
| | | | | 198/730 |
| 3,905,473 | A * | 9/1975 | Jones | B65G 23/44 |
| | | | | 198/718 |
| 3,993,184 | A * | 11/1976 | Campbell | B65G 19/16 |
| | | | | 198/533 |
| 4,071,136 | A * | 1/1978 | Jones | B65G 19/14 |
| | | | | 198/718 |
| 4,325,479 | A * | 4/1982 | Pirovano | B65G 19/24 |
| | | | | 198/733 |
| 4,533,289 | A * | 8/1985 | Guzdar | B01J 3/02 |
| | | | | 198/729 |
| 4,573,568 | A * | 3/1986 | Maag | B65G 19/22 |
| | | | | 198/731 |
| 4,871,060 | A * | 10/1989 | Dahl | B65G 19/14 |
| | | | | 198/716 |
| 4,890,723 | A * | 1/1990 | Debuisson | B23Q 11/0057 |
| | | | | 198/716 |
| 5,048,671 | A * | 9/1991 | Ellsworth | B65G 19/16 |
| | | | | 198/728 |
| 5,062,741 | A * | 11/1991 | Pirovano | B65G 19/14 |
| | | | | 406/76 |
| 5,186,312 | A | 2/1993 | Ambs et al. | |
| 5,318,168 | A * | 6/1994 | Rappen | B65G 19/22 |
| | | | | 198/716 |
| 5,865,296 | A | 2/1999 | Angus | |
| 6,229,092 | B1 * | 5/2001 | Pirovano | B65G 19/14 |
| | | | | 138/123 |
| 6,267,227 | B1 * | 7/2001 | McGoun | B65G 47/78 |
| | | | | 198/359 |
| 6,415,908 | B1 | 7/2002 | Ambs et al. | |
| 6,425,714 | B1 * | 7/2002 | Waddell | B65G 19/14 |
| | | | | 406/145 |
| 6,467,611 | B2 | 10/2002 | Ambs et al. | |
| 6,499,927 | B2 * | 12/2002 | Mitchell | B65G 19/14 |
| | | | | 198/550.8 |
| 6,598,736 | B2 * | 7/2003 | Ellis | B65G 23/44 |
| | | | | 198/716 |
| 6,672,451 | B1 | 1/2004 | Thompson, Jr. et al. | |
| 6,790,399 | B2 | 9/2004 | Fujii | |
| 7,267,218 | B1 | 9/2007 | Van Zee et al. | |
| 8,863,940 | B2 | 10/2014 | Sterner et al. | |
| 9,676,558 | B2 * | 6/2017 | Hellesoe Dall | B65G 19/20 |
| 9,745,135 | B1 | 8/2017 | Nicholson | |
| 9,828,703 | B2 | 11/2017 | Witting | |
| 10,479,608 | B2 * | 11/2019 | Jagan | B65G 19/14 |
| 2002/0043449 | A1 * | 4/2002 | Ambs | B65G 19/14 |
| | | | | 198/716 |
| 2003/0010602 | A1 * | 1/2003 | Jagan | B65G 19/14 |
| | | | | 198/469.1 |
| 2005/0284733 | A1 * | 12/2005 | Malitzki | B65G 19/22 |
| | | | | 198/729 |
| 2006/0163038 | A1 * | 7/2006 | Dall | B65G 19/24 |
| | | | | 198/716 |
| 2007/0170043 | A1 * | 7/2007 | Raijmakers | B65G 19/14 |
| | | | | 198/805 |
| 2009/0266680 | A1 * | 10/2009 | Bertolini | B65G 19/24 |
| | | | | 198/728 |
| 2009/0272632 | A1 * | 11/2009 | Merten | B65G 19/08 |
| | | | | 198/835 |
| 2012/0279829 | A1 * | 11/2012 | Sterner | B65G 19/14 |
| | | | | 198/747 |
| 2014/0311872 | A1 | 10/2014 | Podevyn | |
| 2015/0041285 | A1 * | 2/2015 | Hesketh | B65G 23/44 |
| | | | | 198/728 |
| 2015/0136569 | A1 * | 5/2015 | Kamps | B65G 19/26 |
| | | | | 198/716 |
| 2015/0251852 | A1 * | 9/2015 | Nicholson | B65G 19/28 |
| | | | | 198/733 |
| 2015/0314963 | A1 * | 11/2015 | Chu | B65G 19/08 |
| | | | | 198/731 |
| 2016/0289004 | A1 * | 10/2016 | Hellesoe Dall | B65G 19/24 |
| 2017/0166403 | A1 * | 6/2017 | Kamps | B65G 19/14 |
| 2018/0044820 | A1 | 2/2018 | Witting | |
| 2019/0256293 | A1 * | 8/2019 | Jagan | B65G 19/20 |
| 2020/0039760 | A1 * | 2/2020 | Binford | B65G 19/08 |

FOREIGN PATENT DOCUMENTS

| | | |
|---|---|---|
| JP | 2008-168967 A | 7/2008 |
| KR | 101498558 B1 | 3/2015 |
| KR | 101826182 B1 | 2/2018 |

* cited by examiner

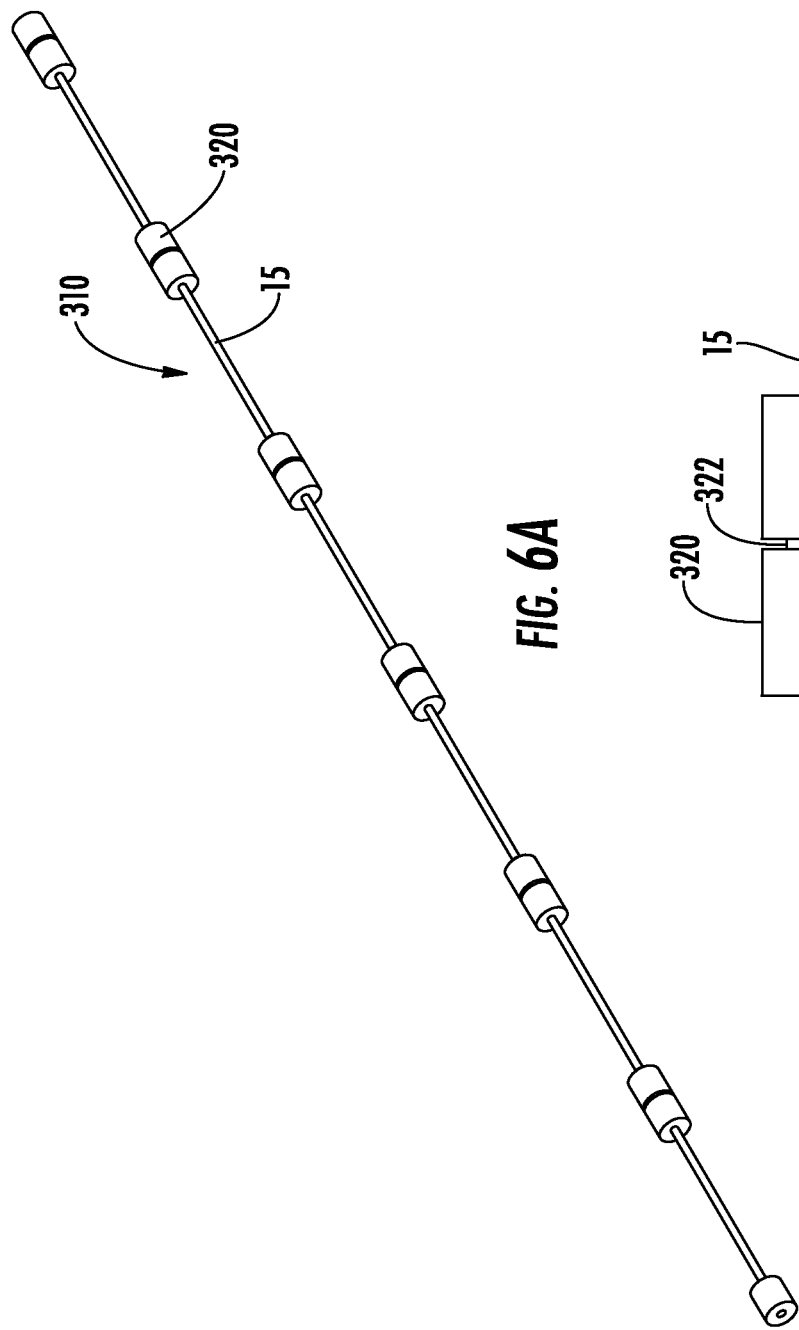
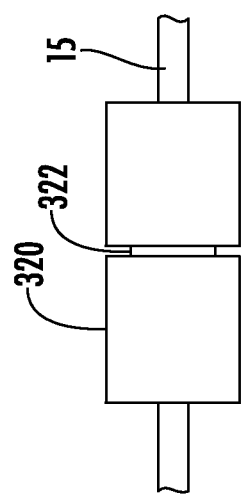
FIG. 6A
FIG. 6B

TUBULAR CABLE CONVEYOR SLUG WITH INTEGRATED CONNECTOR

INCORPORATION BY REFERENCE

The following document is incorporated herein by reference as if fully set forth: U.S. Provisional Application No. 62/721,231, filed Aug. 22, 2018.

FIELD OF INVENTION

The present disclosure is related to a tubular cable conveyor and is more particularly directed to a slug and connector for a tubular cable conveyor.

BACKGROUND

Drag conveyors or cable conveyors are known and generally include an outer tube through which a cable, chain or other traction element is drawn. Disks are attached to the traction element at periodic intervals. By moving the traction element in a transport direction, granular material that is fed through an opening in the tube into spaces between disks is carried forward through the tube to an unloading point so that the granular material can be discharged. Slugs are positioned on the traction element at periodic fixed intervals and define fixing points for the disks.

Such conveyors are useful for moving granular material without damaging or breaking down the material which can occur with augur-type tube conveyors. Since the material is merely pushed along the inside of the tube by the disks which are attached to the conveyor traction element, the likelihood of damage to the granular material being transported is greatly reduced.

Known drag or cable type conveyor systems generally connect the disks to the traction element. Examples of known systems include U.S. Pat. Nos. 2,124,485; 6,672,451; 8,863,940; 9,745,135; US Pub. 2014/0311872; KR 101498558; and KR 101826182.

Known conveyor systems include one driving sprocket and one tensioning sprocket, wherein the sprocket engages the slugs and pull the traction element continuously. The traction element must be connected at two ends to form a loop. Existing techniques and systems require the removal of a preexisting mounting point before an end connection can be made. These end connections are then facilitated by the addition of various other components, such as screws, male and female couplings, retaining rings, welded components, etc. It would be desirable to provide a quicker and more reliable way to form a loop for a traction element that does not require the removal of permanently attached components and replacement thereof.

SUMMARY

A drag conveyor assembly is disclosed that allows for improved functionality and connectivity to form an endless loop for a traction element. The assembly includes a traction element and a plurality of slugs fixedly attached to the traction element. When any one of the slugs is split, each split slug section remains fixedly attached to the traction element.

In one embodiment, the slugs are attached to the traction element via at least one ferrule.

In one embodiment, each slug of the plurality of slugs includes a cutting groove. The cutting grooves facilitate a cutting or slicing process to split the slug into split slug sections.

In one embodiment, the cutting groove is located at an axially medial portion of the slug. In another embodiment, the axially medial portion of the slug has a first thickness, and axial end sections of the slug have a second thickness. In one embodiment, the first thickness is less than 60% of the second thickness. One of ordinary skill in the art would understand that the location and geometry of the cutting groove can be varied.

Each slug can include a pair of flanges with the cutting groove arranged therebetween. The pair of flanges are provided to assist with a mounting/coupling arrangement between two split slug sections.

A coupler is adapted to join a first split slug section to a second split slug section. In one embodiment, the coupler includes a pair of clamps. In one embodiment, each clamp of the pair of clamps has a C-shaped profile. One of ordinary skill in the art would recognize that other types of couplers could be used.

In one embodiment, a disk is attached over the coupler to join the two split slug sections. The disk can include a first disk half and a second disk half which are joined to each other via a fastener. The disk is configured to be pulled through a surrounding tube to move bulk material. One of ordinary skill in the art would understand that the coupler can be optional, and instead the disk can be fixed directly onto the slug.

In another embodiment, a method of modifying a traction element for a drag conveyor assembly is provided. The method includes: (a) providing a first drag conveyor assembly including: a first traction element; and a first plurality of slugs fixedly attached to the traction element via an underlying ferrule pair. The method includes (b) cutting a first slug of the first plurality of slugs to define a first split slug section forming a free end of the first drag conveyor assembly. The method includes (c) coupling the first split slug section to a second split slug section of a second slug via a coupler.

In another embodiment, a method of forming a drag conveyor assembly is provided. The method includes (a) providing a traction element; (b) swaging or crimping a plurality of ferrule pairs on the traction element, each ferrule pair being spaced from an adjacent ferrule pair at a predetermined interval; and (c) molding a slug around each ferrule pair.

These features can be used either alone or in various combinations with one another in order to provide the drag conveyor system in accordance with the invention.

BRIEF DESCRIPTION OF THE DRAWINGS

The foregoing Summary as well as the following Detailed Description will be readily understood in conjunction with the appended drawings which illustrate preferred embodiments of the invention. In the drawings:

FIG. 6A illustrates an alternative configuration for a drag conveyor assembly.

FIG. 6B illustrates an alternative slug for the drag conveyor assembly of FIG. 6A.

DETAILED DESCRIPTION OF THE PREFERRED EMBODIMENTS

Figure 1A:
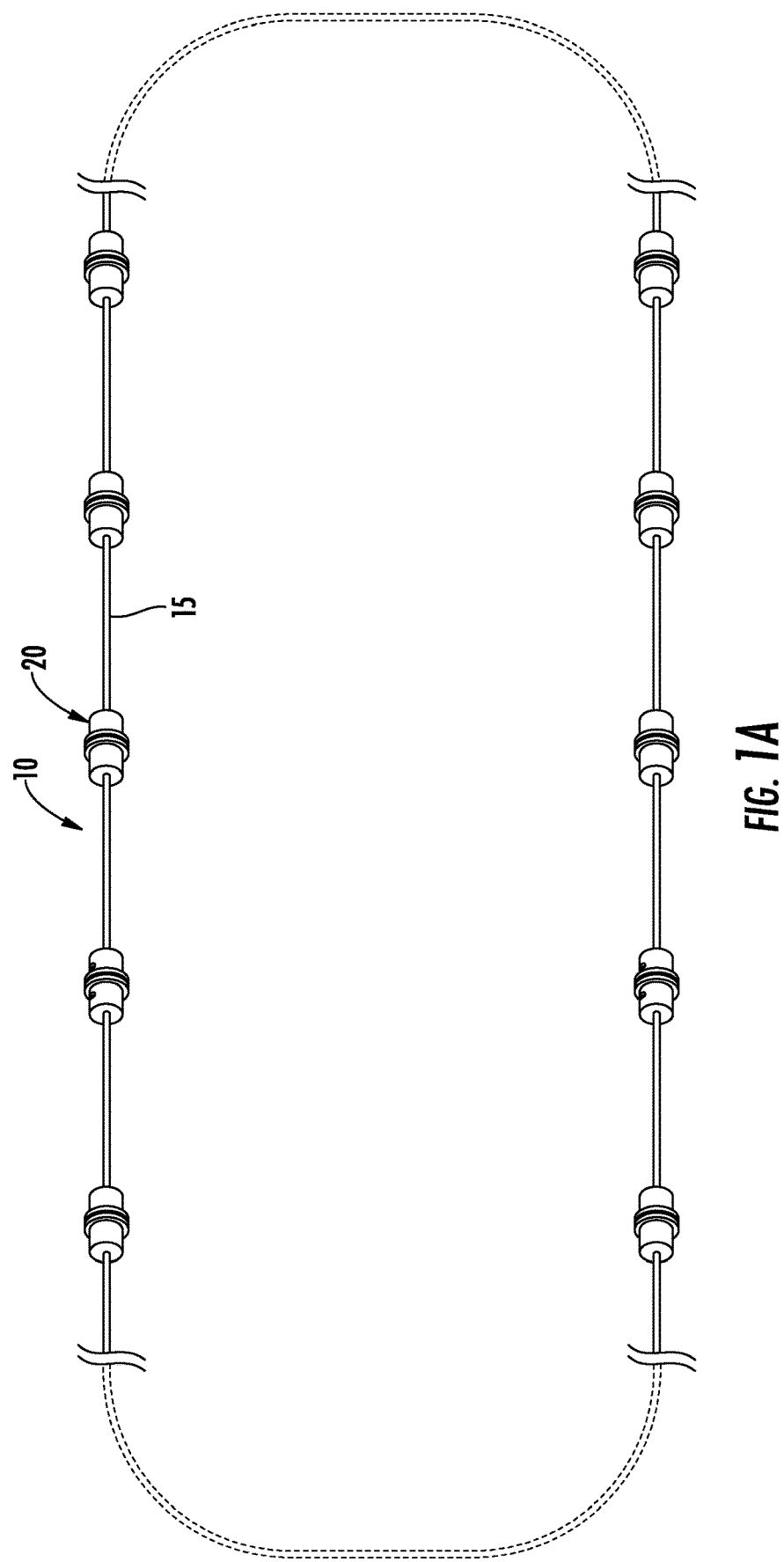
FIG. 1A is a perspective view of a drag conveyor assembly including a traction element and plurality of slugs.

Certain terminology is used in the following description for convenience only and is not considered limiting. The words "right," "left," "lower" and "upper" designate directions in the drawings to which reference is made. This terminology includes the words specifically noted above, derivatives thereof and words of similar import. Additionally, the terms "a" and "one" are defined as including one or more of the referenced items unless specifically noted. As used herein, "traction element" refers to a cable, chain, belt, or other flexible element that can be drawn through a tube to provide a form of motion generation for the disks.

As shown in FIG. 1A, a drag conveyor assembly 10 is disclosed. One of ordinary skill in the art would understand that the drag conveyor assembly 10 is a subcomponent of a larger drag conveyor system, such as disclosed in U.S. Pat. No. 8,863,940, which is incorporated by reference as if fully set forth herein. One of ordinary skill in the art would understand that a drive system would also be provided, such as disclosed in U.S. Pat. No. 810,149, which is incorporated by reference as if fully set forth herein.

The drag conveyor assembly 10 includes a traction element 15. In one embodiment, the traction element 15 is a cable. In one embodiment, the traction element 15 is a wire rope. The traction element 15 is adapted to be driven in an endless loop through an associated tube for conveying granular material through the tube.

A plurality of slugs 20 are fixedly attached to the traction element 15. In one embodiment, the plurality of slugs 20 are each crimped onto the traction element 15. In one embodiment, the slugs 20 are mechanically permanently attached to the traction element 15. In another embodiment, the slugs 20 are chemically permanently attached to the traction element 15. In other embodiments, the slugs 20 are attached via the use of an adhesive, chemical bonding through plastic welding, chemical bonding through metal welding, and/or any other type of bonding/attachment configuration.

The plurality of slugs 20 provides attachment points for disks configured to move granular material, which are described in more detail herein. In one embodiment, the slugs 20 are over-molded onto the traction element 15. Over-molding the slugs 20 onto the traction element 15 ensures that a pitch is maintained at any connection point of the slugs 20 to the traction element 15. One of ordinary skill in the art would understand that a variety of connection methods and procedures could be used to mechanically attach the slugs 20 to the traction element 15.

The slugs 20 are preferably spaced apart at fixed intervals along the traction element 15. One of ordinary skill in the art would understand that these intervals can be adjusted depending on specific requirements for a variety of applications.

Figure 2A:
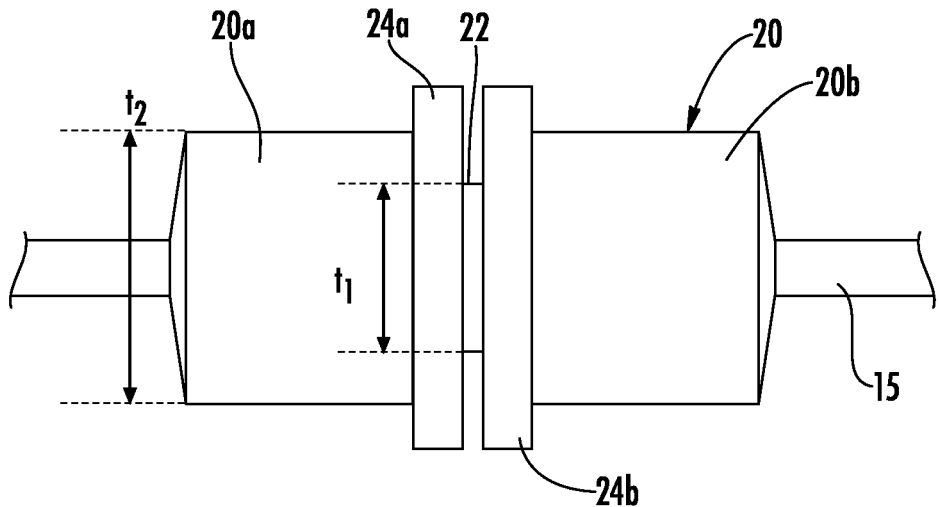
FIG. 2A is a magnified view of a slug fixed to a traction element.

As shown in more detail in FIG. 2A, each slug 20 includes the cutting groove 22, such that when any one of the slugs 20 is cut or split, each split slug section 20a, 20b of the slug 20 remains fixedly attached to the traction element 15. In one embodiment, the axial ends of each slug 20 are each crimped to the traction element 15. The split slug sections 20a, 20b allow for unlimited connectivity arrangements with another split slug section of the drag conveyor assembly 10 or with a secondary/separate drag conveyor assembly, which also includes a traction element and plurality of slugs. The split slug sections 20a, 20b each generally correspond to approximately one half of a slug 20. However, one of ordinary skill in the art would recognize that the slug 20 can be split into split slug sections 20a, 20b of unequal sizes.

One of ordinary skill the art would recognize from the present disclosure that a variety of cutting groove configurations can be provided. The dimensions, depth, shape, location, and other characteristics of the cutting groove can be varied. Visual indicators can be provided at the cutting groove location.

As shown in FIG. 2A, the cutting groove 22 is located at an axially medial portion of the slug 20. In one embodiment, the axially medial portion of the slug 20 is defined at an axial midway point of the slug 20, and is more particularly defined at an axial midway point of the slug 20 at 50%+/−10% of an axial length of the slug 20. In one embodiment, the axially medial portion of the slug 20 is defined as an axial portion that overlaps with an axial midpoint of the slug 20. In one embodiment, the cutting groove 22 overlaps with an axial midpoint of the slug 20.

As shown in FIG. 2A, the axially medial portion of the slug 20 which includes the cutting groove 22 has a first thickness (t1). As also shown in FIG. 2, axial end portions of each slug 20 have a second thickness (t2). In one embodiment, the first thickness (t1) is less than 60% of the second thickness (t2). In another embodiment, the first thickness (t1) is less than 40% of the second thickness (t2). One of ordinary skill in the art would understand that the thickness of the cutting groove 22 region of the slug 20 can be modified.

As shown in FIG. 2A, each slug 20 includes a pair of flanges 24a, 24b with the cutting groove 22 arranged therebetween. The flanges 24a, 24b act as mounting flanges and facilitate coupling split slug sections 20a, 20b to each other, as described in more detail herein.

Figure 3A:
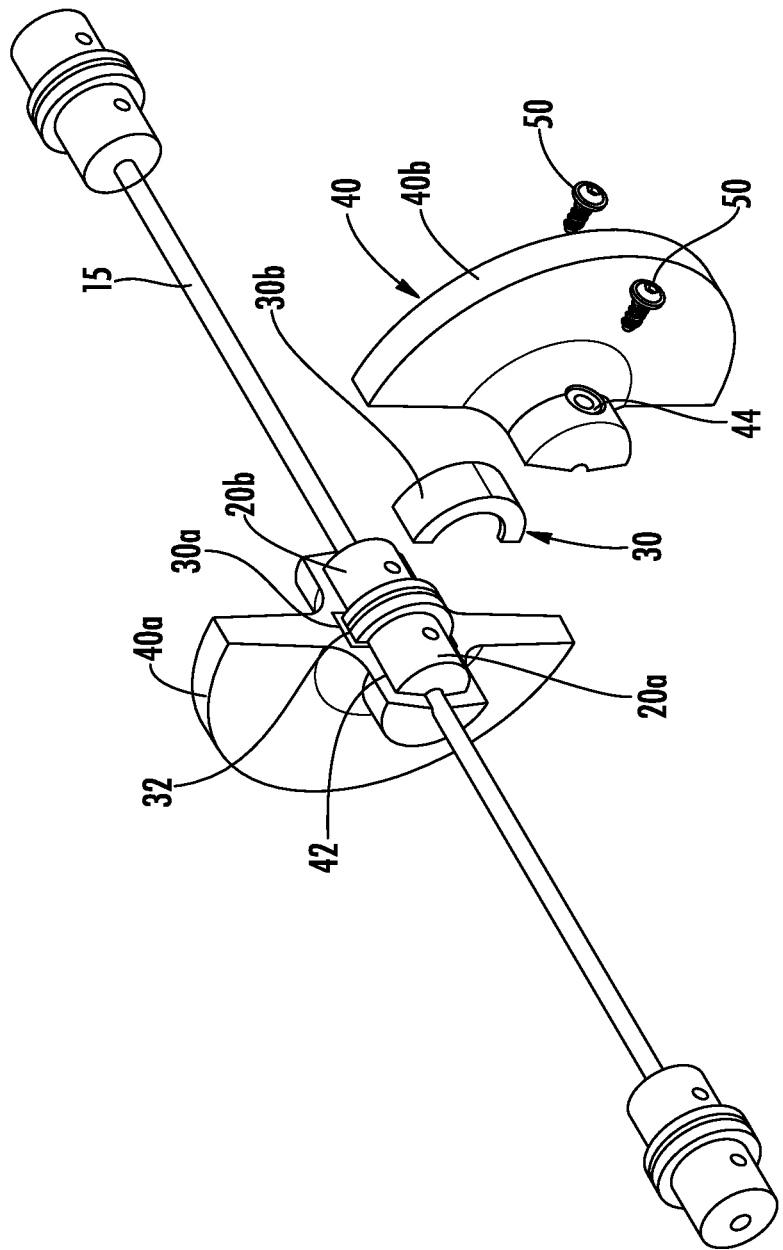
FIG. 3A is a perspective view of a partially assembly drag conveyor assembly.

As shown in FIG. 3A, a coupler 30 is adapted to join a first split slug section 20a of the first slug to a second split slug section 20b of a second slug. The term coupler 30 is used herein to refer to any type of mechanical fastener capable of joining two portions of a slug 20. In one embodiment, the coupler 30 includes a pair of clamps 30a, 30b. In one embodiment, the pair of clamps 30a, 30b have a C-shaped profile. The two clamps 30a, 30b can be identical. Other known type of coupling arrangements could be used, such as sleeves, collars, fittings, braces, brackets, or any other type of component capable of fixing two parts to each other. The coupler 30 generally defines a pocket 32 adapted to receive at least a portion of two split slug sections 20a, 20b. The geometry and size of the pocket 32 of the coupler 30 can be modified depending on the specific geometry and size of the associated slugs 20.

Figure 2B:
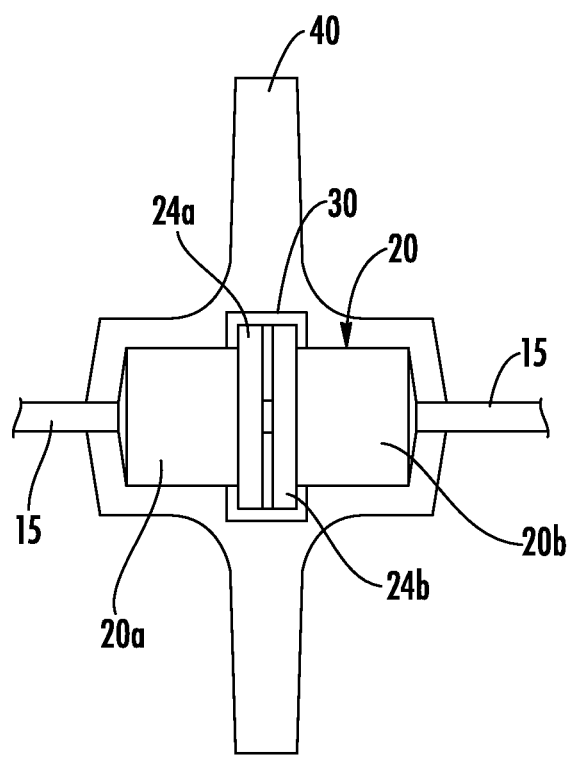
FIG. 2B is a cross-section view of a slug including a coupler and disk.

As shown in FIGS. 2B and 3A, a disk 40 is attached over the coupler 30. The disk 40 is used for conveying bulk or granular material. The size and shape of the disk 40 can be modified depending on a particular application. The disk 40 defines a pocket 42 adapted to receive combination of the slug 20 and the associated coupler 30. The disk 40 can be formed in two disk halves 40a, 40b as shown in FIG. 3A. In one embodiment, the two disk halves 40a, 40b can be identical. As shown in FIG. 3A, a fastener 50 can be provided to join the two disk halves 40a, 40b to each other. The disk halves 40a, 40b can include openings 44 for receiving the fasteners 50. The fastener 50 is illustrated as a screw, but could be embodied as any variety of known fastening means. Any type of fastener could be used, such as the fasteners and fastening configuration disclosed in U.S. Pat. No. 8,863,940, which has been incorporated by reference as if fully set forth herein. Once the fasteners 50 are installed, the combination of the split slug sections 20a, 20b, the coupler 30, and the disk 40 are securely retained with each other. The disk 40 is attached at a medial portion of the slug 20.

In one embodiment, a disk half 40a can be integrated with a coupler 30 component, such as clamp 30a. One of ordinary skill in the art would understand from the present disclosure that a combined disk-coupler component could be used instead of separate coupler 30 and disk 40 configurations. One of ordinary skill in the art would understand that multiple varieties of fastening components could be used.

Figure 3B:
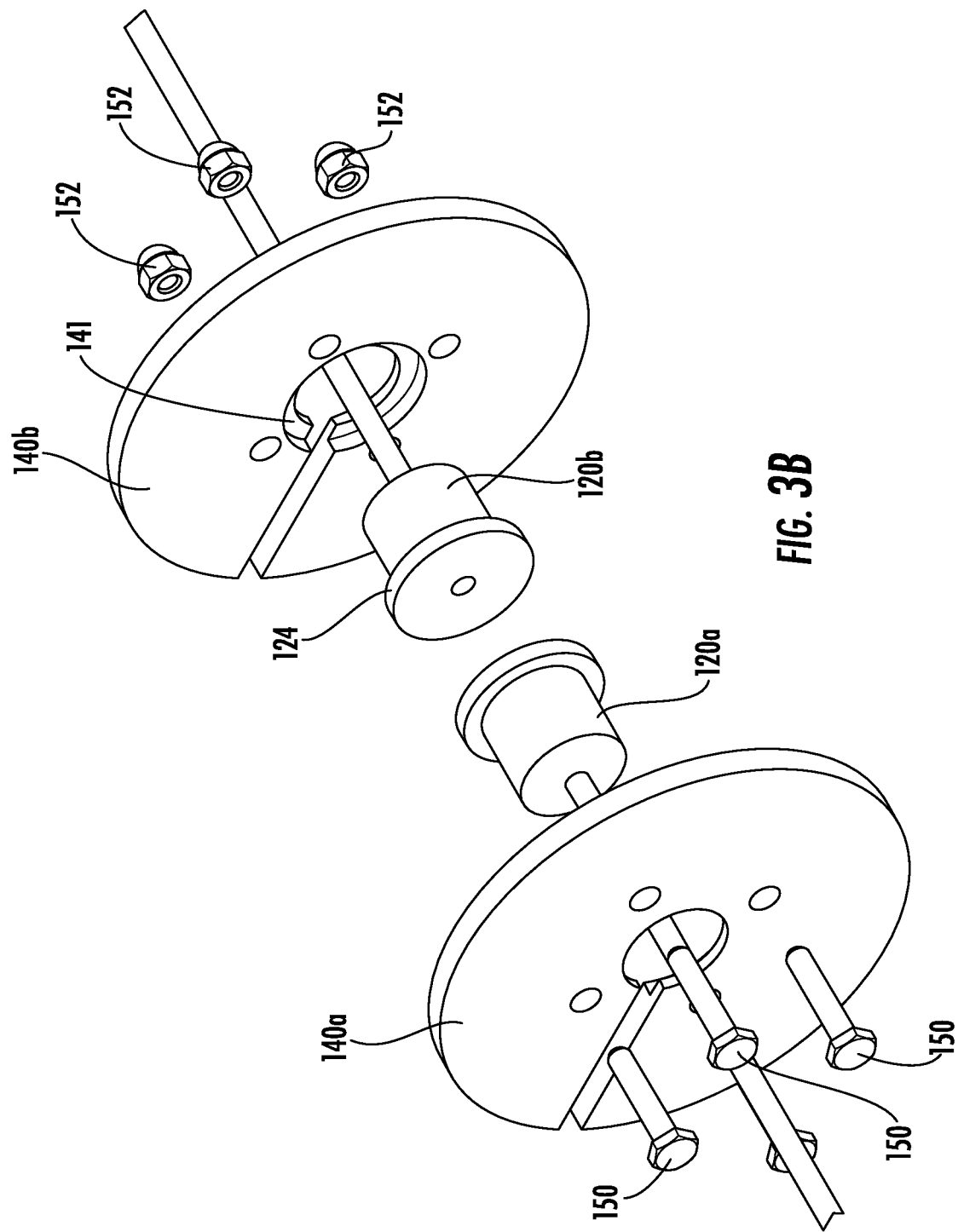
FIG. 3B is a perspective view of a partially assembled drag conveyor assembly with an alternative disk and fastener arrangement.

FIG. 3B illustrates an alternative configuration of a drag conveyor assembly including split slug sections 120a, 120b, disk halves 140a, 140b, and fasteners 150, 152. The function of the components is identical as disclosed with respect to FIG. 3A. In this embodiment, a coupler is not required, and the disk halves 140a, 140b are used to join the split slug sections 120a, 120b. Bolts 150 and nuts 152 are used to secure the two disk halves 140a, 140b to each other. As shown on disk half 140b, a retention shoulder 141 is formed. The retention shoulder 141 is adapted to receive a flange 124 formed on the split slug sections 120a, 120b.

Figure 1B:
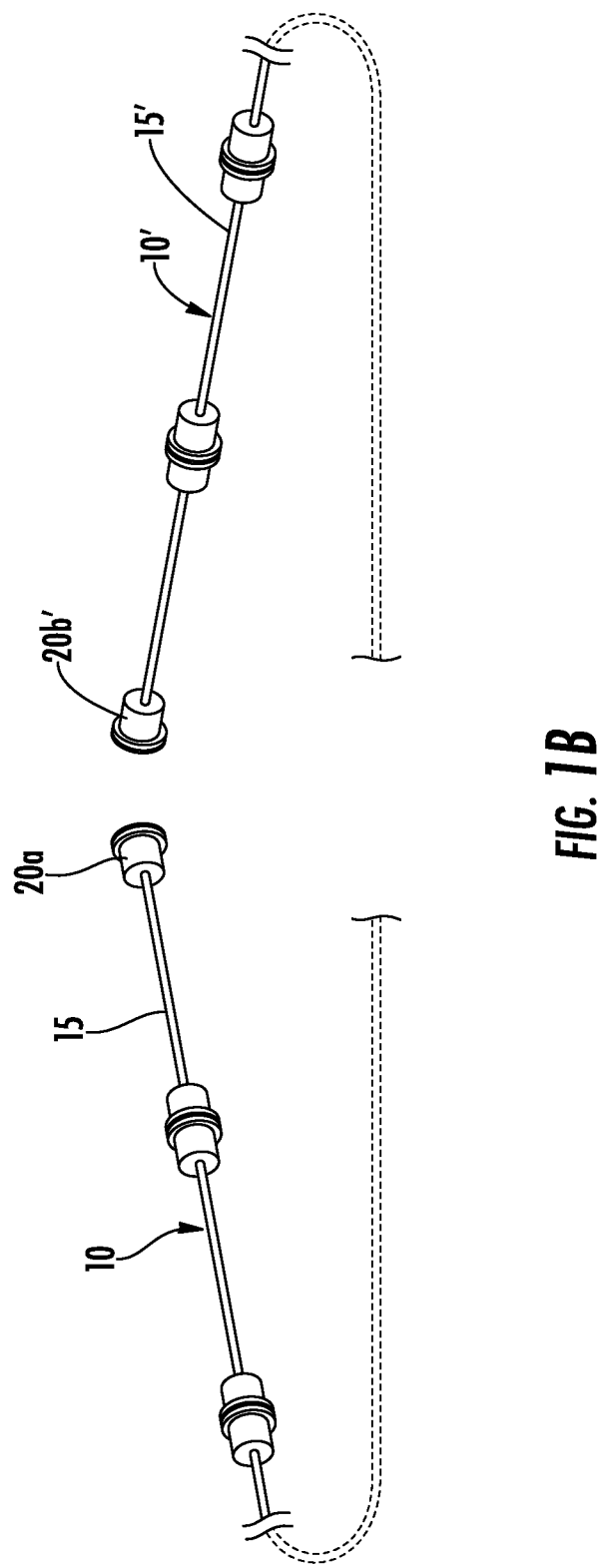
FIG. 1B is a perspective view of the drag conveyor assembly of FIG. 1A prior to forming an endless loop.

As shown in FIG. 1B, a first split slug section 20a is illustrated immediately prior to being joined to a second split slug section 20b'. The first split slug section 20a can be defined on a first drag conveyor assembly 10 including a first traction element 15. The second split slug section 20b' can be defined on a second drag conveyor assembly 10' including a second traction element 15'. Alternatively, a single drag conveyor assembly 10 can be provided and slugs 20 can be split and rejoined to different slugs 20 within the same drag conveyor assembly 10. One of ordinary skill in the art would recognize that multiple configurations could be used to connect two different split slug sections to each other to form a variety of drag conveyor assemblies.

In one embodiment, a method of modifying a traction element 15 for a drag conveyor assembly 10 is disclosed. In one embodiment, the method includes providing a first drag conveyor assembly 10 including a first traction element 15 and a first plurality of slugs 20 fixedly attached to the traction element 15. The drag conveyor assembly 10 can be provided as an endless loop or as a predetermined segment including two free ends. The free ends can either include a complete slug 20, or split slug sections 20a, 20b.

The method includes cutting a first slug 20 to define a first split slug section 20a forming a free end of the first drag conveyor assembly 10. In one embodiment, a secondary slug 20' is also cut at its cutting groove 22. The method includes coupling the first split slug section 20a to a second split slug section 20b via a coupler 30. In one embodiment, the cutting operation occurs at a cutting groove 22 of the slug 20.

In one embodiment, the second split slug section 20b is defined on a free end of the first drag conveyor assembly 10 such that the first drag conveyor assembly 10 defines an endless loop after the coupling step. In this embodiment, the method is used to shorten or replace the first drag conveyor assembly 10.

In one embodiment, the second split slug section 20b' is defined on a free end of a secondary drag conveyor traction element assembly 10' such that the first and second drag conveyor assemblies 10, 10' combine to form an endless loop after the coupling step. In this embodiment, the method is used to elongate the first drag conveyor assembly 10 by the addition of secondary assemblies. Multiple secondary assemblies can be added to the first drag conveyor assembly 10 to increase the length of the assembly 10.

Figure 4:
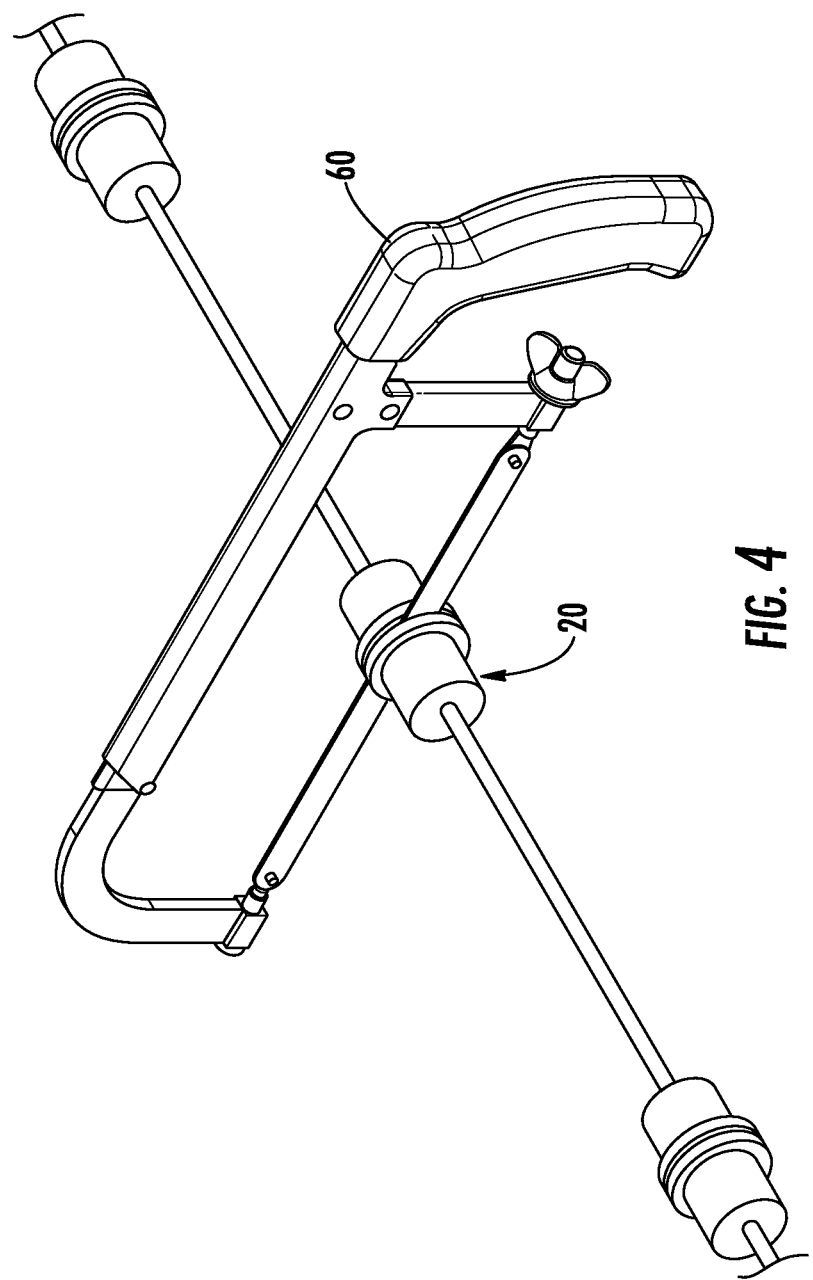
FIG. 4 is a perspective view of a cutting tool for modifying a drag conveyor assembly.

In one embodiment, the cutting step is performed via a sawing tool 60, as shown in FIG. 4. One of ordinary skill in the art would understand that any type of cutting tool can be used to split the slugs 20. The cutting groove 22 provides guidance for a user to manually align the cutting tool 60 in the desired region of the slug 20 to perform an efficient and reliable cutting operation. The cutting groove 22 also provides a reduced material thickness of the slug 20 such that the cutting operation can be performed relatively quickly.

The drag conveyor assembly 10 including the traction element 15 and slugs 20 can be manufactured in a variety of ways. In one embodiment, free ends of the drag conveyor assembly 10 include slugs 20. In another embodiment, a first free end of the of the drag conveyor assembly 10 includes a slug 20 and a second free end of the drag conveyor assembly 10 includes a split slug section 20a. In another embodiment, both free ends of the drag conveyor assembly 10 include split slug sections 20a, 20b.

In another embodiment, a method of modifying an installed drag conveyor assembly 10 is provided. The term modifying can include lengthening, shortening, repairing, or otherwise changing a characteristic of the installed drag conveyor assembly 10. The method can include cutting the drag conveyor assembly 10 at two slug 20 sites, such that the drag conveyor assembly 10 defines two free ends. The method can include installing a secondary drag conveyor assembly 10' between the two free ends of the drag conveyor assembly 10. Installation of the secondary drag conveyor assembly 10' can be performed according to any of the methods or configurations disclosed herein, i.e. through the use of a coupler 30 to join two split slug sections, etc.

Figure 5A:
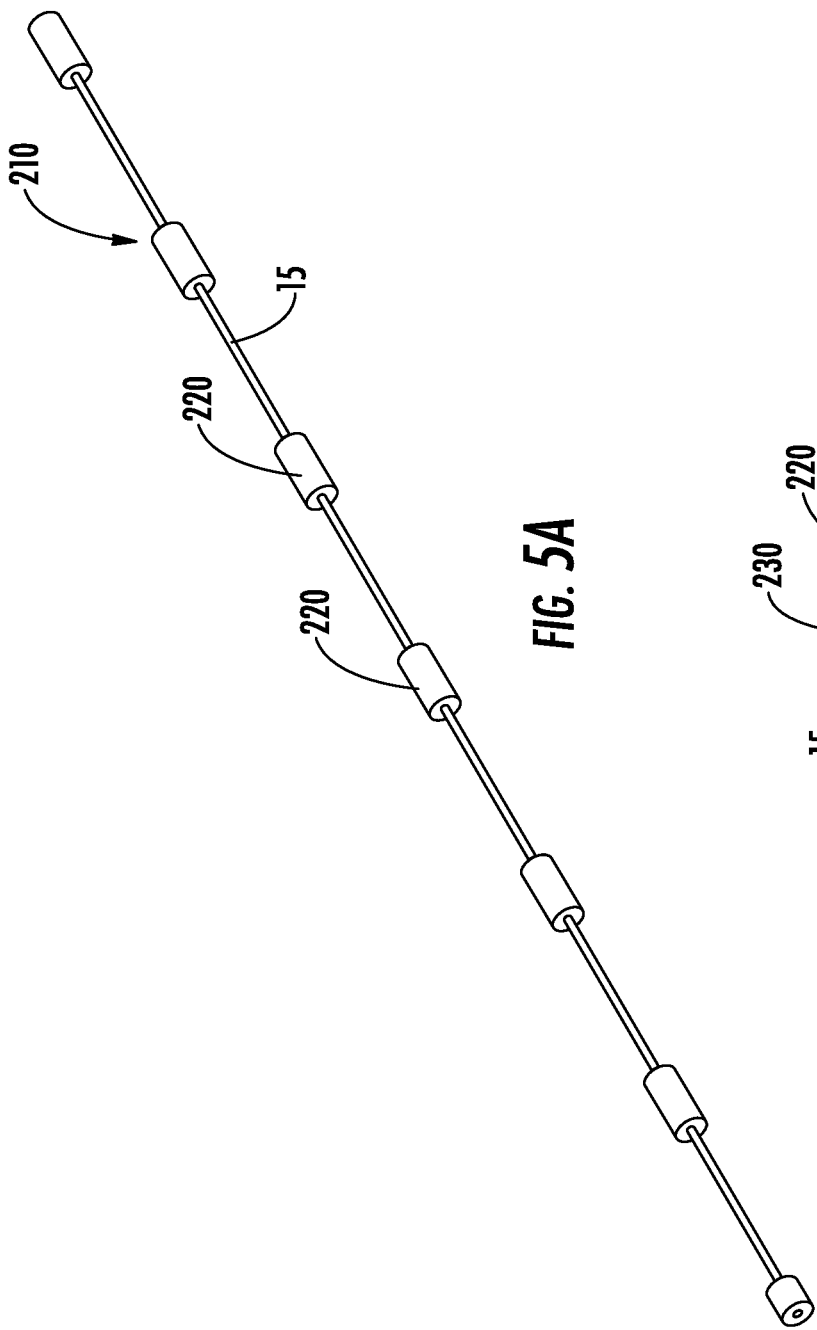
FIG. 5A illustrates an alternative configuration for a drag conveyor assembly.
Figure 5B:
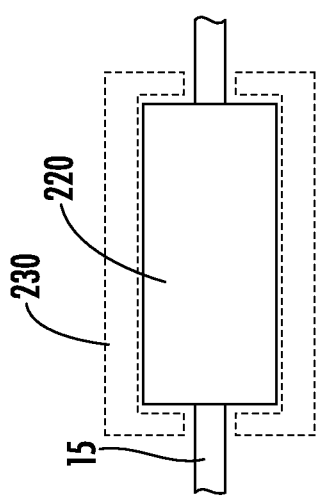
FIG. 5B illustrates an alternative slug for the drag conveyor assembly of FIG. 5A.

As shown in FIGS. 5A and 5B, in one embodiment, the slugs 220 have an elongated cylindrical shape without flanges or grooves in a drag conveyor assembly 210. In this embodiment, the slugs 220 have a smooth cylindrical outer surface, and lack any flanges or cutting grooves. A cutting tool or aid can be used to assist a user in cutting the slug in an appropriate location. A coupler 230 is illustrated in phantom lines in FIG. 5B showing how a coupler 230 surrounds the axial ends of the slug 220. One of ordinary skill in the art would understand that other types of couplers 230 can be used. The functionality and the slugs 20 described herein.

As shown in FIGS. 6A and 6B, in one embodiment, the slugs 320 include a cutting groove 322 but lack flanges. The functionality and connectivity of these slugs are identical to the other features of slug 20 described herein. A modified coupler, such as the coupler 230 shown in FIG. 5B, is used to join two split slugs 320 in this embodiment.

Figure 7:
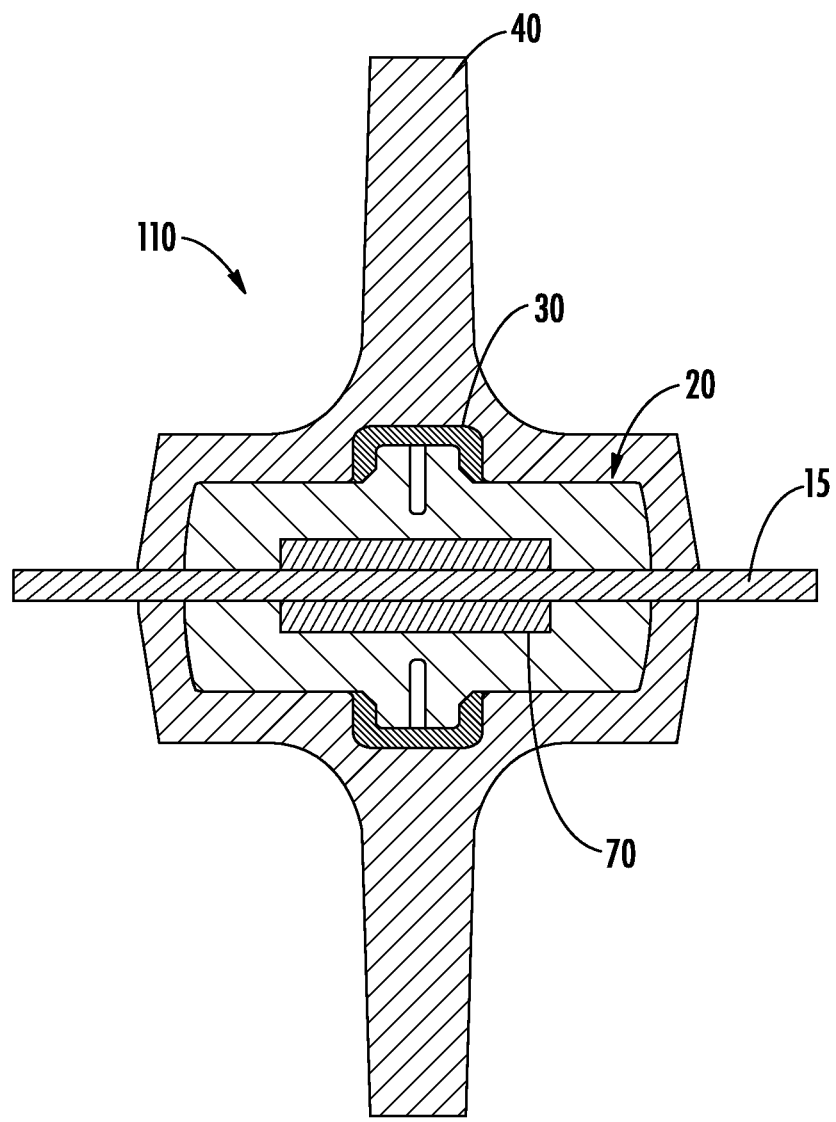
FIG. 7 illustrates an embodiment of a single ferrule for fixing a slug to a traction element.
Figure 8A:
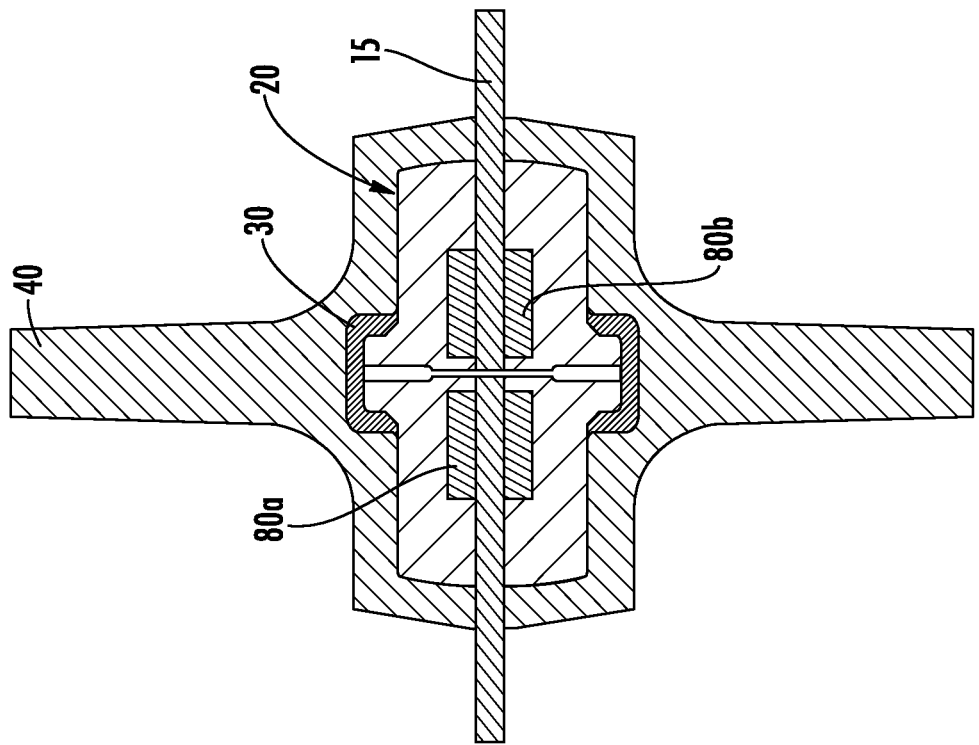
FIG. 8A illustrates an embodiment of a ferrule pair for fixing a slug to a traction element.
Figure 8B:
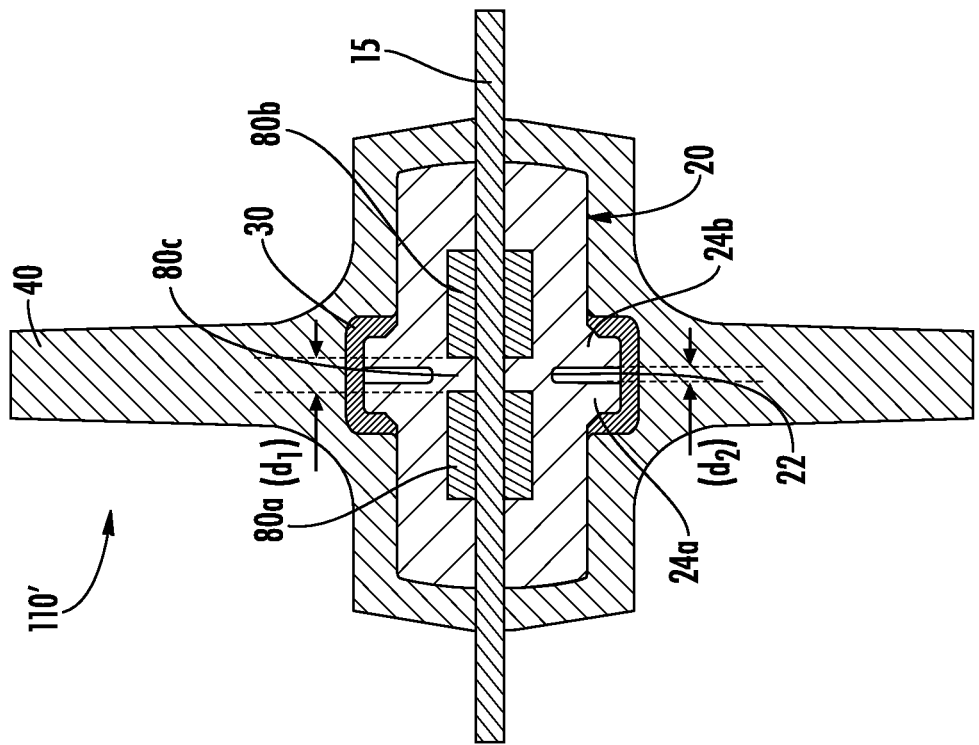
FIG. 8B illustrates the ferrule pair of FIG. 8A after rejoining two split slug ends.

As shown in FIGS. 7, 8A, and 8B, the slugs 20 can be attached to the traction element 15 via ferrules 70, 80a, 80b. FIG. 7 illustrates one embodiment of the drag conveyor assembly 110 including a single ferrule 70, and FIGS. 8A and 8B illustrate another embodiment of the drag conveyor assembly 110' including a ferrule pair 80a, 80b.

Each of the ferrules 70, 80a, 80b can be swaged or crimped onto the traction element 15. One of ordinary skill in the art would understand that the ferrules 70, 80a, 80b can be attached to the traction element 15 via other connection arrangements. The ferrules 70, 80a, 80b are spaced along the traction element 15 at predetermined spacing and at fixed intervals. A single slug 20 can surround and attach to the single ferrule 70 or the ferrule pair 80a, 80b. The slug 20 can be overmolded onto the ferrules 70, 80a, 80b. One of ordinary skill in the art would understand that the slug 20 can be attached to the ferrules 70, 80a, 80b via other fixing or attaching configurations.

A gap 80c is defined between the ferrules 80a, 80b. The gap 80c between the ferrules of the ferrule pair 80a, 80b can be controlled via a swaging die. One of ordinary skill in the art would understand that alternative ways and methods of setting this gap 80c can be used. The ferrules 80a, 80b are preferably identical to each other. Although only one slug 20 is illustrated in FIGS. 7, 8A, and 8B, one of ordinary skill in the art would understand that a plurality of slugs 20 (each having an underlying ferrule 70 or ferrule pair 80a, 80b) are arranged along the traction element 15 as illustrated in FIG. 1A. An outer surface of the ferrules 70, 80a, 80b can include a cylindrical outer surface or a non-round surface.

As shown in FIGS. 8A and 8B, the gap 80c has an axial extent (d1) that is greater than an axial extent (d2) defined by the cutting groove 22 of the slug 20. This difference in sizing of the gap 80c and the cutting groove 22 ensures that any cutting operation to split the slug 20 into split slug sections (for re-sizing, repairing, replacing etc.) will not damage the underlying ferrules 80a, 80b. The ferrules 80a, 80b are therefore not cut or otherwise damaged while cutting the traction element 15 to adjust its length, or repair or replace a segment. The slug 20 seals or encapsulates the underlying ferrule pair 80a, 80b, such that both ferrules of the ferrule pair 80a, 80b are not exposed during a cutting operation. This ensures that the connection between the ferrule pair 80a, 80b and the traction element 15 is not compromised.

The features described herein overcome multiple issues with the prior art. For example, the slug design disclosed herein alleviates the complexity and issues associated with maintaining the pitch of the cable while removing slugs.

The embodiments disclosed herein do not require removal of slugs, and instead require cutting slugs along a pre-set cutting groove. All of the slugs on any drag conveyor assembly are permanently fixed in position and do not need to be removed to modify an assembly.

The embodiments disclosed herein also avoid issues related to removing slug material, such as nylon or polymers, from within the traction element strands.

The slug/traction element configurations disclosed herein avoid the need to cut a traction element to size. The associated handling of sharp or fragmented traction element ends and splinters are therefore avoided.

The embodiments disclosed herein also ensure that the tension in the associated traction element is properly set and maintained, by allowing users to either lengthen (via introducing extension drag conveyor assemblies) or shorten (via cutting a single drag conveyor assembly) existing drag conveyor assemblies.

It will be appreciated by those skilled in the art that changes can be made to the embodiments of the invention described above without departing from the broad inventive concept thereof.

The embodiments disclosed herein also ensure the integrity of the end connectors can be controlled and guaranteed by a manufacturer, thus reducing the risk of failure resulting from improperly applied or unmaintained end connector components.

It is also understood that various portions of the invention can be used alone or in combination and that not all of the components are required for any particular application. It is therefore understood that this invention is not limited to the particular embodiments disclosed, but it is intended to cover modifications within the spirit and scope of the present invention.

The invention claimed is:

1. A drag conveyor assembly comprising:
   a traction element;
   a plurality of slugs fixedly attached to the traction element, each slug of the plurality of slugs includes a pair of flanges with a cutting groove arranged therebetween;
   a pair of ferrules that connect each slug of the plurality of slugs to the traction element, each slug of the plurality of slugs being overmolded onto a respective pair of the ferrules, such that when a first slug of the plurality of slugs is split to define two split slug sections, each split slug section remains fixedly attached to the traction element; and
   a disk attached to each slug of the plurality of slugs.

2. The assembly of claim 1, wherein the cutting groove is located at an axially medial portion of each slug, and the axially medial portion of each slug has a first thickness, end sections of each slug have a second thickness, and the first thickness is less than 60% of the second thickness.

3. The assembly of claim 1, further comprising a coupler adapted to join a first split slug section of the first slug to a second split slug section of a second slug.

4. The assembly of claim 3, wherein the disk is attached over the coupler.

5. The assembly of claim 1, wherein the ferrules of the ferrule pair are spaced apart from each other by a gap having an axial extent that is greater than an axial extent of the cutting groove defined by the slug.

6. The assembly of claim 1, wherein the at least one ferrule is swaged onto the traction element.

* * * * *